Aug. 5, 1958 L. I. GOLDFISCHER ET AL 2,846,583

VOLTAGE CONTROLLED MULTIVIBRATOR OSCILLATOR

Filed Dec. 18, 1956

INVENTOR.
LESTER I. GOLDFISCHER
ANASTASIO di BENEDETTO
BY
H. L. Mackay
ATTORNEY

United States Patent Office 2,846,583
Patented Aug. 5, 1958

2,846,583

VOLTAGE CONTROLLED MULTIVIBRATOR OSCILLATOR

Lester I. Goldfischer, New Rochelle, and Anastasio di Benedetto, Bedford, N. Y., assignors to General Precision Laboratory Incorporated, a corporation of New York Application December 18, 1956, Serial No. 629,057

5 Claims. (Cl. 250—36)

This invention relates to adjustable frequency oscillators and more specifically to oscillators which are linearly controllable.

In instrument design it is sometimes desirable, in controlling the frequency of an alternating current generator by adjustment of a direct potential, to control the frequency over a wide range in exact linear relationship with the controlling direct potential. The present invention accomplishes this purpose with exactness and is applicable to high frequency outputs.

The present instrumentation is a free-running multivibrator and generates a square wave output. The timing is effected by capacitors associated with the multivibrator tube cathodes and charged by constant-current generators. Cathode followers may be connected in the multivibrator feedback interconnections in order to prevent the feedbacks from loading the multivibrator tubes. Diode clamps are employed in the anode circuits of the multivibrator tubes to limit their voltage excursions to precise values.

The principal purpose of this invention is to provide an oscillator having its frequency linearly adjustable by a control voltage.

Another purpose is to provide a linear variable frequency oscillator for a relatively high and wide range of frequencies.

A further understanding of this invention may be secured from the detailed description and associated drawings, in which.

Figure 1:
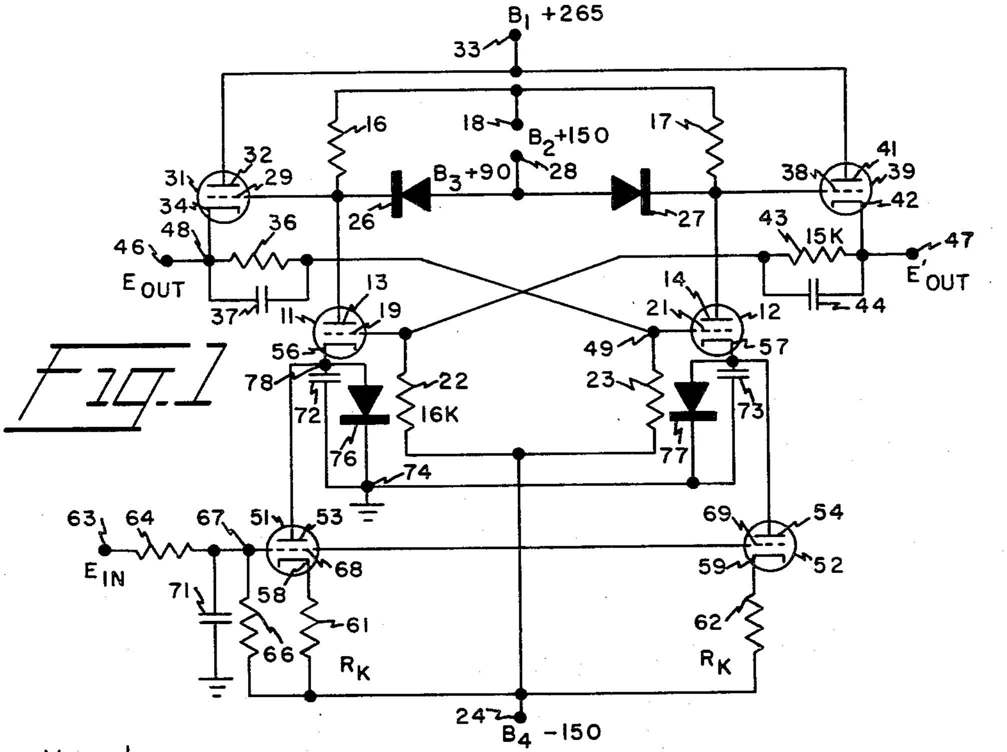
Figure 1 depicts the circuit of an embodiment of the invention.

Referring now to Fig. 1, a pair of triode electronic discharge tubes 11 and 12 are connected in a circuit slightly resembling the Eccles-Jordan bistable circuit. These tubes will be termed the multivibrator pair. Their anodes 13 and 14 are connected through resistors 16 and 17 to a source of positive potential of value $B_2$ represented by terminal 18. The control grids 19 and 21 are statically biased, partly by being connected through resistors 22 and 23 to a source of negative potential of value $B_4$, represented by terminal 24.

Diodes 26 and 27 are connected as "plate catchers" between anodes 13 and 14 and a source of positive potential of value $B_3$, represented by terminal 28. These diodes 26 and 27 may be of any type for low frequency applications up to, perhaps, 40 kilocycles per second. For applications up to about 250 kc. p. s. if semiconductor junction diodes are used they must have low recovery time of the order of ¼ $\mu$s. That is, the recovery time should not be greater than roughly 5% of one cycle of oscillation.

The two multivibrator feedback paths from the anode of one tube to the grid of the other are traced as follows. Anode 13 is connected to the grid 29 of a triode 31 having its anode 32 connected to a source of positive potential of value $B_1$, represented by terminal 33. The cathode 34 of triode 31 is connected through resistors 36 and 23 in series to the negative potential terminal 24, with the common resistor terminal connected to the control grid 21 of multivibrator tube 12. Resistor 36 is shunted by a small capacitor 37. The second feedback path is similar and symmetrical in connections and magnitudes of components. The control grid 38 of a triode 39 is connected to anode 14 of multivibrator tube 12, and anode 41 is connected to positive terminal 33. Cathode 42 is connected through resistors 43 and 22 in series to negative terminal 24, with the common resistor terminal connected to the other multivibrator tube grid 19. Resistor 43 is shunted by capacitor 44. Output terminals 46 and 47 are connected to cathodes 34 and 42.

The two resistors 22 and 23 are shunted by the grid capacitances of the multivibrator tubes 11 and 12 and by distributed capacitance. Each of the two pairs of resistors in series, resistors 36 and 23 as one pair and resistors 43 and 22 as the other, constitutes an aperiodic or pulse voltage divider. That is, for example, any signal frequencies applied to terminal 48 of the former pair will appear in unchanged relative amplitudes at terminal 49. The necessary condition is that the products of the resistances and capacitances shall be equal.

The values of potential represented by $B_1$, $B_2$, $B_3$ and $B_4$ are relative to ground, $B_1$ being the highest positive value and $B_3$ the lowest. All four potentials are closely regulated.

The triodes 51 and 52 are connected to operate as constant current generators. Anodes 53 and 54 are connected to the multivibrator cathodes 56 and 57, and cathodes 58 and 59 are connected to negative terminal 24 through large resistors 61 and 62. A direct-current control potential $E_{in}$, the magnitude of which determines the frequency of the multivibrator pair is applied through terminal 63 to a voltage divider consisting of resistors 64 and 66, the common terminal 67 being connected to the grids 68 and 69 of triodes 51 and 52. A small capacitor 71 may be connected to terminal 67 to smooth any electrical disturbances. Parameters are so selected that the constant current tubes 51 and 52 operate on the substantially linear portions of their characteristic curves.

The constant-current behavior of triodes 51 and 52 is secured by the use of large cathode resistors $R_k$. The anode current of each is then very closely proportional to the potential $E_g$ applied between the grid and the terminal $B_4$, and is substantially independent, with circuit values employed, of conditions in the anode circuit during oscillation. That is, the anode current $i_p$ is closely:

$$i_p = \frac{E_g}{R_k} \quad (1)$$

Capacitors 72 and 73 are connected between the respective multivibrator cathodes 56 and 57 and a ground terminal 74. They are shunted by diodes 76 and 77 which clamp them to ground potential when the respective cathode tends to be positive, which occurs at one part of each cycle during oscillation.

Diodes 76 and 77 may be of any type for low frequency operation, but if of the semiconductor type fast recovery time is desirable to enhance oscillator linearity and is necessary when operating at frequencies near the upper limit of frequency for which such diodes can be used, that is, about 250 kc. p. s. It is particularly important that the diodes change from low impedance to high impedance rapidly. By low impedance is meant the forward diode impedance of 20 or 30 ohms and by high impedance is meant the backward diode impedance of, perhaps, 500,000 ohms. Since the recovery speed of tube diodes is higher than that of semiconductor diodes, tube diodes are more satisfactory in this respect and their use is mandatory above about 250 kc. p. s.

The two capacitors 72 and 73 constitute the heart of this circuit, for the linear timing of each half cycle of oscillator operation is effected by the charging of one of these capacitors at a constant rate of voltage increase. That this rate is constant is seen by stating the instantaneous voltage V across capacitor 72 having capacitance C in accordance with basic electrical theory:

$$V=\frac{1}{C}\int i_p dt \quad (2)$$

Since $i_p$ is constant, $$V=\frac{i_p t}{C} \quad (3)$$

which is to say that the instantaneous voltage across capacitor 72 is linear with time. Since $i_p$ is linear with $E_{in}$, the instantaneous voltage across capacitor 72 is linear with $E_{in}$ also. That is $$V=\frac{E_i t}{R_k C} \quad (4)$$

In discussing the operation of the oscillator, since the circuit is symmetrical between the input grids 68 and 69 and the output terminals 46 and 47, a description of one-half cycle of operation will be sufficient. As an explicit example, the value of resistors 36 and 43 may be taken as 15,000 ohms, that of resistors 22 and 23 as 16,000 ohms, and that of resistors 61 and 62 as 40,000 ohms. Capacitors 72 and 73 are each 91 $\mu\mu$f. The potential sources relative to ground terminal 74 are:

$B_1=+265$ volts; $B_2=+150$ volts; $B_3=+90$ volts; $B_4=-150$ volts

At an instant during oscillation when tube 12 has just become conductive its anode 14 potential drops to +90 volts, diode 27 being conductive. Grid 38 is +90 volts and cathode 42 is about +90 volts. Therefore grid 19 is −34 volts. Tube 11 having just become non-conductive, its anode 13 is at +265 volts as is grid 29 and the cathode 34 also approximates this potential. Grid 21 is therefore at a mean potential between $B_1$ and $B_4$ determined by the voltage divider 36/23 of +64 volts. Catnode 57 being at about the same level, diode 77 becomes conductive, rapidly discharging capacitor 73 and bringing the potential of cathode 57 to about ground potential. Since grid 19 is −34 volts its cathode 56 is also at about that level, causing diode 76 to become non-conductive. This is the situation at this instant.

The constant current generator 51 supplies current to terminal 78 and, since both tube 11 and diode 76 are non-conductive, all of the current goes into capacitor 72. The potential of the upper plate of this capacitor immediately starts to descend toward the negative potential $B_4$ of −150 volts substantially linearly at a rate determined by the input potential $E_{in}$ applied to grid 68. This is illustrated in graph A of Fig. 2 by the downwardly slanting line 79 which is linear with time and which has an angle of slope controlled by $E_{in}$.

When the potential of cathode 56, Fig. 1, equalling the potential of capacitor 72, reaches a level several volts above that of grid 19, tube 11 begins to conduct. Conduction increases at a rapid rate because of the regenerative nature of the multivibrator circuit until tube 11 conducts and tube 12 becomes non-conductive. Specifically, reduction of the voltage of anode 13 reduces the voltage of grid 21, reducing conduction of tube 12 and increasing the voltage of anode 14. This increases the voltage of grid 19, increasing the conductivity of tube 11. The increase of voltage at grid 19 also increases the voltage level of cathode 56 until at about ground level diode 76 becomes conductive, tying cathode 56 to ground level, terminating the sawtooth charge and discharging capacitor 72. The termination of charge of capacitor 72 and its discharge are both indicated by the nearly vertical line 81, Fig. 2, graph A. The potential of cathode 56 and capacitor 72 remains at ground level 82, Fig. 2, during the ensuing half cycle while the other half of the oscillator gotes through an identical series of operations.

Figure 2:
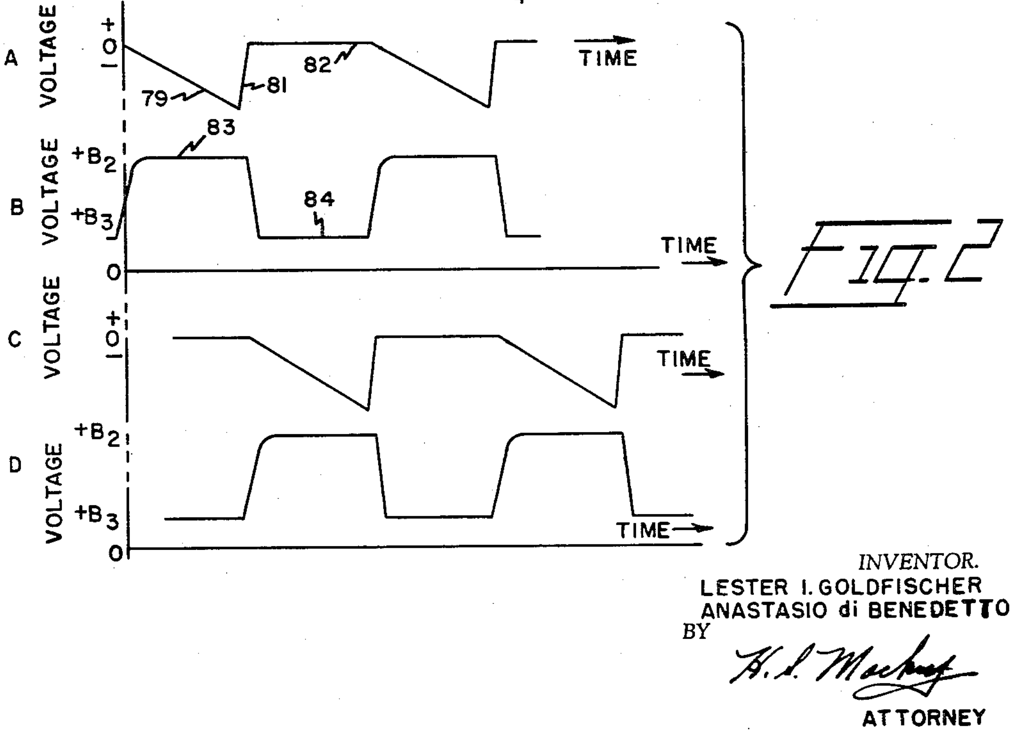
Figure 2 depicts graphs illustrating voltage variations at the timing capacitors and at multivibrator anodes.

The voltage variations of the anode 13 during the described half cycle, during which tube 11 was non-conductive, are illustrated in Fig. 2 by curve B the voltage level being constant as indicated by line 83 at the potential of source $B_2$. At the termination of the half cycle and during the ensuing half cycle the voltage is at the $B_3$ level as indicated by line 84. Identical curves but at opposite phases are shown in Fig. 2 curves C and D for the capacitor 73 and anode 14. The potentials E and E′ of output terminals 46 and 47 are substantially those of anodes 13 and 14 respectively.

When the frequency of oscillation is not higher than 15 kc. p. s. sufficient accuracy for most purposes may be secured without employing the cathode followers 31 and 39. In that case the output terminal 46 and the end terminal 48 of the pulse voltage divider are connected directly to anode 13, and terminal 47 and divider resistor 43 are similarly connected directly to anode 14. When the cathode follower tubes are employed, at any output frequency they permit sensing of the upper or $B_2$ potential of the multivibrator tube anode without causing potential drop in the anode resistor. They thus contribute to frequency-stability. These tubes also lower the effective anode-to-grid capacitances of the multivibrator tubes, thus at high frequencies removing one limitation on rapidity of anode potential rise of these tubes. The cathode follower tubes also present low impedances to the output terminals 46 and 47, permitting the driving of low impedance loads.

What is claimed is:

1. A voltage-controlled oscillator comprising, a pair of oscillator tubes each having at least a grid, anode and cathode, a pair of feedback circuits each interconnecting the anode of one of said tubes to the grid of the other, a pair of timing capacitors each connected between the cathode of a respective tube and a voltage reference terminal, a pair of unidirectionally conducting means each shunting a respective one of said capacitors, a pair of constant current generators each connected to apply negative current to the respective junctions of said cathodes and said capacitors, and means applying a single control potential to both of said pair of constant current generators linearly controlling said current amplitudes, said pair of tubes, pair of capacitors and pair of current generators spontaneously generating relaxation oscillations.

2. A voltage-controlled oscillator comprising, a pair of electronic oscillator tubes each having at least a grid, anode and cathode, a diode having an anode and a cathode connected between each of said anodes and a source of positive potential, the anode of each of said diodes being connected to said source, a pair of feedback circuits each interconnecting the anode of one of said tubes to the grid of the other, a pair of timing capacitors each connected between the cathode of a respective said tube and a voltage reference terminal, a pair of diodes each having an anode and a cathode, each diode shunting a respective one of said capacitors, the anodes of said pair of diodes being connected to said cathodes, a pair of constant current generators each connected to apply negative current to the respective junctions of said cathodes and said capacitors, and means applying a single control potential to both of said pair of constant current generators linearly controlling said current amplitudes.

3. A voltage-controlled oscillator comprising, a pair of electronic oscillator tubes each having at least a grid, anode and cathode, a voltage supply resistor connected to supply a positive potential to each of said anodes, a diode having an anode and a cathode connected between each of said anodes and a source of lesser positive potential, the anode of each of said diodes being connected to said source, a pair of feedback circuits each interconnecting the anode of one of said tubes to the grid of the other, each of said feedback circuits including one of a pair of voltage divider circuits, a pair of timing capacitors each connected between the cathode of a respective tube and a voltage reference terminal, a pair of diodes each having an anode and a cathode shunting each of said capacitors, the anode of each of said pair of diodes being connected to a respective cathode, a pair of constant current generators each connected to apply negative current to the respective junctions of said cathodes and said capacitors, and means applying a single control potential for linearly controlling the current outputs of both of said pair of constant current generators.

4. A voltage-controlled oscillator comprising, a pair of oscillator tubes each having at least a grid, anode and cathode, a voltage supply resistor connected to supply a positive potential to each of said anodes, a diode having anode and cathode connected between each of said oscillator tube anodes and a source of lesser positive potential, the anodes of said diodes being connected to said source, a pair of feedback circuits interconnecting the anode of one of said tubes and the grid of the other, each of said feedback circuits including a respective one of a pair of voltage dividers, a pair of timing capacitors each connected between the cathode of a respective tube and a voltage reference terminal, a diode having an anode and a cathode shunting each of said capacitors, the diode anode being connected to said tube cathode, a pair of constant current generator tubes each containing at least a grid, anode and cathode, a pair of large resistances each connecting a respective one of the cathodes of said generator tubes to a source of negative potential, means connecting each anode of said generator tubes to a respective cathode of said oscillator tubes, and means applying a single control potential to both grids of said generator tubes for varying the output currents thereof linearly with respect to said control potential.

5. A voltage-controlled oscillator comprising, a pair of oscillator tubes each having at least a grid, anode and cathode, a pair of feedback circuits each interconnecting the anode of one of said tubes to the grid of the other, each of said feedback circuits including one of a pair of cathode follower tubes each containing at least a grid, anode and cathode, the grid of a respective cathode follower being connected to the anode of one oscillator tube with the cathode thereof connected to the grid of the other oscillator tube whereby the grid-cathode internal circuit of a respective cathode follower is included in a respective feedback path, a pair of timing capacitors each connected between the cathode of a respective oscillator tube and a voltage reference terminal, a pair of unidirectionally conducting means each shunting a respective one of said capacitors, a pair of constant current generators each connected to apply negative current to the respective junctions of said oscillator cathode and said capacitors and means applying a single control potential to both of said pair of constant current generators for linearly controlling the current outputs thereof.

References Cited in the file of this patent

UNITED STATES PATENTS

| | | |
|---|---|---|
| 2,456,089 | Shenk et al. | Dec. 14, 1948 |
| 2,577,074 | Dickinson | Dec. 4, 1951 |

OTHER REFERENCES

"Waveforms," by Chance et al., vol. 19, Radiation Lab. Series, McGraw-Hill, page 187.